United States Patent
Kakas et al.

(10) Patent No.: US 12,065,203 B2
(45) Date of Patent: Aug. 20, 2024

(54) METHOD FOR CONTROLLING A STEER-BY-WIRE STEERING SYSTEM AND STEER-BY-WIRE STEERING SYSTEM FOR A MOTOR VEHICLE

(71) Applicants: thyssenkrupp Presta AG, Eschen (LI); thyssenkrupp AG, Essen (DE)

(72) Inventors: Peter Kakas, Budapest (HU); Àdám Varga, Budapest (HU); Daniel Vizer, Csabdi (HU)

(73) Assignees: thyssenkrupp Presta AG, Eschen (LI); thyssenkrupp AG, Essen (DE)

( * ) Notice: Subject to any disclaimer, the term of this patent is extended or adjusted under 35 U.S.C. 154(b) by 373 days.

(21) Appl. No.: 17/435,973

(22) PCT Filed: Mar. 2, 2020

(86) PCT No.: PCT/EP2020/055448
§ 371 (c)(1),
(2) Date: Sep. 2, 2021

(87) PCT Pub. No.: WO2020/178242
PCT Pub. Date: Sep. 10, 2020

(65) Prior Publication Data
US 2022/0144334 A1    May 12, 2022

(30) Foreign Application Priority Data
Mar. 6, 2019    (DE) .................... 10 2019 203 040.8

(51) Int. Cl.
*B62D 5/04* (2006.01)
*B62D 6/00* (2006.01)

(52) U.S. Cl.
CPC ........... *B62D 5/0463* (2013.01); *B62D 6/002* (2013.01); *B62D 6/008* (2013.01)

(58) Field of Classification Search
CPC ....... B62D 5/0463; B62D 6/002; B62D 6/008
(Continued)

(56) References Cited

U.S. PATENT DOCUMENTS 8,175,773 B2 * 5/2012 Nishimori ............ B62D 5/0493
180/443
9,598,102 B2   3/2017 Millsap et al.
(Continued)

FOREIGN PATENT DOCUMENTS

CN           102574540 A         7/2012
DE    10 2014 201 107 A1    8/2014
(Continued)

OTHER PUBLICATIONS

English Translation of International Search Report issued in PCT/EP2020/055448, dated May 28, 2020.

*Primary Examiner* — Hunter B Lonsberry
*Assistant Examiner* — Helen Li
(74) *Attorney, Agent, or Firm* — thyssenkrupp North America, LLC

(57) ABSTRACT

A method for controlling a steer-by-wire steering system for a motor vehicle may involve determining a torque request signal with a position controller of an activation unit based at least on a desired steering angle and an actual steering angle, limiting the torque request signal in a signal limiting device of the activation unit such that the torque requested by the limited torque request signal is limited to a permissible torque range, and transmitting the limited torque request signal to an electronically controllable steering actuator. The signal limiting device may determine a reference torque signal by way of a reference controller based at least on the desired steering angle and the actual steering angle. The signal limiting device may define the permissible (Continued)

torque range by way of a selectable maximum deviation from the reference torque signal.

8 Claims, 3 Drawing Sheets

(58) Field of Classification Search
USPC .......................................................... 701/41
See application file for complete search history.

(56) References Cited

U.S. PATENT DOCUMENTS

| | | |
|---|---|---|
| 2012/0101685 A1 | 4/2012 | Engels et al. |
| 2012/0191301 A1 | 7/2012 | Benyo et al. |
| 2014/0222295 A1 | 8/2014 | Dornhege et al. |
| 2015/0259007 A1* | 9/2015 | Di Cairano ............ B62D 6/003 |
| | | 701/41 |
| 2017/0144699 A1 | 5/2017 | Millsap et al. |
| 2019/0202498 A1* | 7/2019 | Karve .................. B62D 5/0463 |
| 2020/0023894 A1* | 1/2020 | Naik ...................... B62D 6/008 |

FOREIGN PATENT DOCUMENTS

| | | |
|---|---|---|
| DE | 10 2015 204 332 A1 | 9/2015 |
| EP | 2 483 130 B1 | 8/2012 |

* cited by examiner

METHOD FOR CONTROLLING A STEER-BY-WIRE STEERING SYSTEM AND STEER-BY-WIRE STEERING SYSTEM FOR A MOTOR VEHICLE

CROSS REFERENCE TO RELATED APPLICATIONS

This application is a U.S. National Stage Entry of International Patent Application Serial Number PCT/EP2020/055448, filed Mar. 2, 2020, which claims priority to German Patent Application No. DE 10 2019 203 040.8, filed Mar. 6, 2019, the entire contents of both of which are incorporated herein by reference.

FIELD

The present disclosure generally relates to steer-by-wire steering systems, including methods for controlling steer-by-wire steering systems.

BACKGROUND

In steer-by-wire steering systems for motor vehicles, there is no longer a mechanical connection between a steering wheel operated by the driver and the steered wheels. Instead, the position of the steered wheels is adjusted by an electronically controlled steering actuator in order to guide the vehicle on the desired path. For this purpose, a feedback actuator connected to the steering column provides a desired position signal that represents the driver's steering intention. The steering actuator is then activated with a torque request signal via a position controller with sufficient power and bandwidth in such a way that the steered wheels are adjusted to the desired position.

This safety-critical control task has to ensure a high level of failure safety so that the vehicle, despite not having the mechanical connection, remains steerable even in the event of a defective position controller and the driver retains control of the vehicle. For this reason, it is important to develop safety concepts for the control circuit of the steering actuator.

A method for attenuating irregularities in a first control command for controlling a power steering system of a vehicle is known from U.S. Pat. No. 9,598,102 B2. The method generates a range signal indicative of a range of command values on the basis of a multiplicity of input signals and determines whether the first control command is out of range for more than a predetermined amount of time. If the first control command relates to an assist torque to be provided by the power steering system, the range can be determined on the basis of the vehicle speed and a steering wheel steering torque. The method limits the first control command to the range and sends the limited first control command to the power steering system in response to the first control command being out of range for less than or equal to the predetermined amount of time. A second control command is generated on the basis of a subset of the multiplicity of input signals and sent to the power steering system in response to it being determined that the first control command is out of range for more than the predetermined amount of time. It is disadvantageous that the previously known method only insufficiently takes into account the driving situation in which the motor vehicle is located, and therefore the generated range signal has to be equally applicable to a large number of different driving situations, such as cornering and straight-ahead driving. This generally applicable range has to be selected to be correspondingly large, as a result of which incorrect control commands can only be recognized late due to large irregularities.

Thus a need exists for a method for controlling a steer-by-wire steering system and a steer-by-wire steering system for a motor vehicle, by means of which the safety and reliability of the steering are improved.

DETAILED DESCRIPTION

Figure 1:
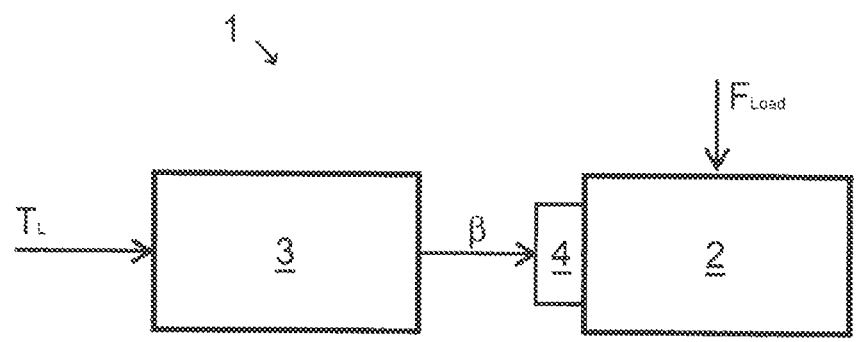
FIG. 1 is a schematic view of an example steer-by-wire steering system.

Although certain example methods and apparatuses have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

This creates a control of a steer-by-wire steering system which ensures faster error detection and improved controllability of the motor vehicle in the event of an error. The control method according to the invention provides a signal limiting device which contains a reference controller as a safety module in addition to a position controller. The reference controller makes it possible to take into account both the actual steering angle provided by the steering actuator and the desired steering angle provided by the feedback actuator when determining the permissible torque range.

In this way, the external forces acting on the steered wheels in the respective driving situation, which counteract a setting of the desired steering angle, for example by the control deviation between the actual and desired steering angle, can be taken into account in order to determine a safe reference torque. This reference torque is suitable for adjusting the desired steering angle of the steering actuator with a tolerable control deviation. At the same time, the reference torque is safe in the sense that it does not cause any sudden or unforeseen changes in the vehicle state and the vehicle remains controllable. Starting from this reference torque, a safe, permissible torque range is determined on the basis of a specifiable maximum deviation. The method according to the invention adapts the permissible torque range to a torque to be anticipated in the respective driving situation. The deviations that occur in a properly functioning position controller are therefore reduced, so that a reduced maximum deviation is sufficient to distinguish incorrect signals of the position controller from correct signals. A defective position controller can thus be identified more quickly. In addition, the permissible torque range adapted to the driving situation leads to improved controllability of the vehicle on the basis of the limited torque request signal in the event of a fault in the position controller.

The momentary angular velocity of the steering actuator is preferably taken into account when determining the reference torque signal. As a result, the reference controller can react more quickly to a changing actual steering angle due to external influences, for example due to contact with the curb.

The reference torque signal preferably contains a component proportional to the control deviation between desired and actual steering angle and a component dependent on the angular velocity of the steering actuator. The reference controller can thus be designed as a PD controller, which avoids or at least reduces overshoots in the control. In particular, it can be provided that the reference controller is adapted in an optimized manner to reduce the control deviation.

The maximum deviation used to determine the permissible torque range can be selected depending on the driving speed of the vehicle. As a result, steering interventions by further assistance systems, for example corrective steering functions of an active steering, can be tolerated in a speed-adjusted manner.

The position controller preferably has a higher bandwidth than the reference controller. Owing to the higher bandwidth of the position controller, the control of the steer-by-wire steering system can also regulate higher-frequency interferences in normal operation. In the event that such interferences or incorrect operation of the position controller lead(s) to instability in the control section due to the requested torque building up, the control via the reference controller with a lower bandwidth falls back to a robust and reliable control with a tolerable control deviation.

Further refinements of the invention can be gathered from the following description and the dependent claims.

In FIG. 1, the structure of a steer-by-wire steering system for a motor vehicle according to a first embodiment of the invention is illustrated schematically. The steer-by-wire steering system 1 has an electronically controllable steering actuator 2 which acts on steered wheels and which detects an actual steering angle α of the steered wheels (see FIG. 2), and a feedback actuator 3 which detects a desired steering angle β set via a steering wheel. Furthermore, an activation unit 4 is provided which activates the steering actuator 2 in accordance with the desired steering angle β and the actual steering angle α with a limited torque request signal $PT_{req}$.

The feedback actuator 3 is acted upon by the driver by means of a steering torque $T_L$ as an input variable exerted on a steering wheel. The feedback actuator can be designed to measure the adjustment of the steering wheel brought about by the steering torque $T_L$ by means of a rotation angle sensor and to assign a desired steering angle β to the measured angle. Alternatively, the feedback actuator can measure the steering torque $T_L$ and can assign a desired steering angle β thereto. The desired steering angle β is transmitted to the activation unit 4 as an output signal of the feedback actuator 3. The activation unit 4 can be part of the steering actuator 2 as an integrated control device or it can be designed as a separate control device. A steering load $F_{load}$ acts on the steering actuator 2 from the steered wheels and counteracts an adjustment of the actual steering angle α by the steering actuator 2 and/or subjects the actual steering angle α to different malfunctions depending on the driving situation. Such external steering loads can be caused, for example, by restoring forces in the straight-ahead position when cornering or by forces due to cross winds.

The structure according to the invention and the mode of operation of the activation unit 4 will be explained in more detail with reference to the first exemplary embodiment illustrated schematically in FIGS. 2 and 3. The activation unit 4 has a position controller 5 and a signal limiting device 6, the signal limiting device 6 containing a reference controller 7 (see FIG. 3).

The activation unit 4 carries out the following method to control the steer-by-wire steering system 1.

The position controller 5 of the activation unit 4 determines a torque request signal $T_{req}$ based at least on the desired steering angle β and the actual steering angle α. The torque request signal $T_{req}$ is then limited in the signal limiting device 6 of the activation unit 4 such that the torque requested by the limited torque request signal $PT_{req}$ is limited to a permissible torque range R. For this purpose, the signal limiting device 6 determines a reference torque signal $T_{ref}$ by means of a reference controller 7 based at least on the desired steering angle β and the actual steering angle α and defines the permissible torque range R by means of a selectable maximum deviation A from the reference torque signal $T_{ref}$. Finally, the limited torque request signal $PT_{req}$ is transmitted to the steering actuator 2.

Figure 3:
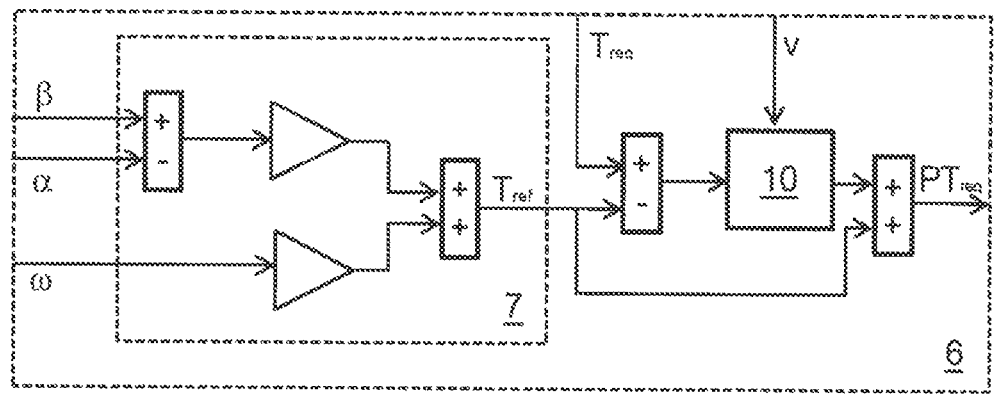
FIG. 3 is a schematic view of an example signal limiting device according to the examples in FIGS. 1 and 2.

As illustrated in FIG. 3, a momentary angular velocity ω of the steering actuator 2 is preferably taken into account when determining the reference torque signal $T_{ref}$. By taking into account the angular velocity ω in the reference controller 7, a damping term can be included in the control, said damping term counteracting rapid changes in the actual setting angle α. This makes it possible to take into account, in the calculation of the reference torque signal $T_{ref}$, the torque required for the damping of suddenly occurring disturbing forces that change the actual setting angle α.

The position controller 5 preferably has a higher bandwidth than the reference controller 7. In the event that the signal limiting device 6 intervenes in the control via the reference controller 7, the lower bandwidth of the reference controller 7 may lead to a reduced accuracy of the position control and to an unfamiliar steering sensation. However, it is ensured that the regulated position remains within defined safety tolerances. Due to the reduced bandwidth, however, the required computing capacity can advantageously also be reduced. The lower complexity of the reference controller thus serves to increase the safety of the steering system.

The ratio of the bandwidths of position controller 5 and reference controller 7 is preferably in the range from 7:6 to 4:3. In particular, the bandwidths of the controllers 5, 7 can be in the range from 5 Hz to 20 Hz. The position controller 5 can preferably have a shorter delay than the reference controller 7.

As illustrated in FIG. 3, a control deviation e is preferably determined in the reference controller 7 as the difference between the desired steering angle α and actual steering angle β, which is then preferably linearly amplified and summed with a signal component dependent on the angular velocity ω for determining the reference torque signal $T_{ref}$. The reference torque signal $T_{ref}$ thus preferably contains one component proportional to the difference in the desired steering angle β and the actual steering angle α and one component dependent on the angular velocity ω of the steering actuator 2.

The reference controller 7 can be adapted in an optimized manner to reduce the control deviation e. For this purpose, for example, the two aforementioned signal components can be weighted with respect to one another in such a way that the control deviations e that occur in certain driving situations are minimized.

According to the first exemplary embodiment illustrated in FIG. 3, the signal limiting device 6 determines a deviation in the torque request signal $T_{req}$ from the reference torque signal $T_{ref}$. The deviation is then limited—in the limiter unit 10—to the selectable maximum deviation A. As a limited torque request signal $PT_{req}$, the signal limiting device 6 finally outputs the sum of the limited deviation and the reference torque signal $T_{ref}$.

The maximum deviation A can be selected here depending on a driving speed v of the vehicle. At high speeds, even a small maximum deviation A is sufficient, for example, to be able to tolerate the steering interventions of a crosswind assistant or lane keeping assistant within the permissible torque range, while a larger maximum deviation A can be advantageous to tolerate a parking assistant that intervenes at low speeds.

Figure 2:
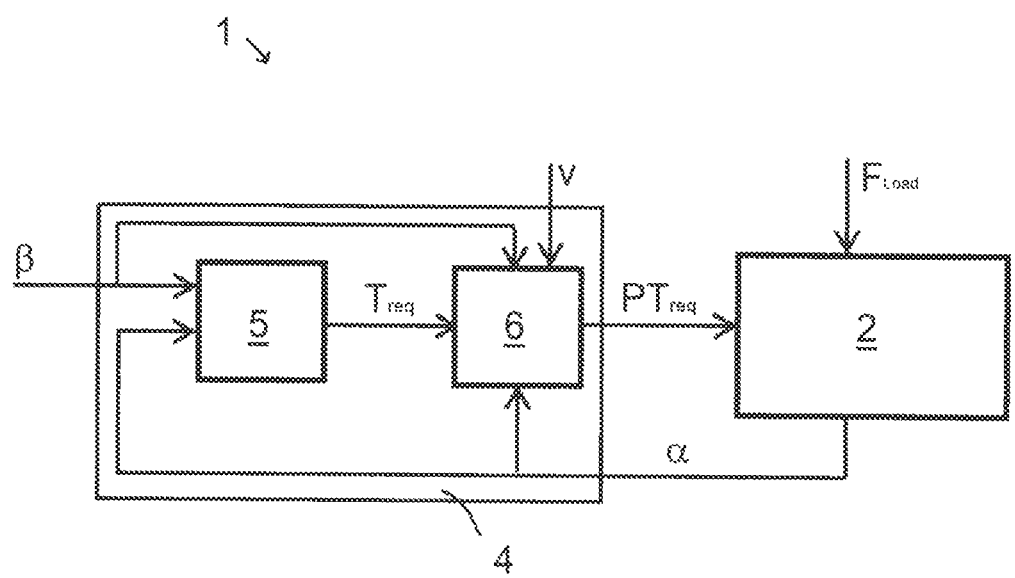
FIG. 2 is a schematic view of an example activation unit according to the example according to FIG. 1.
Figure 4:
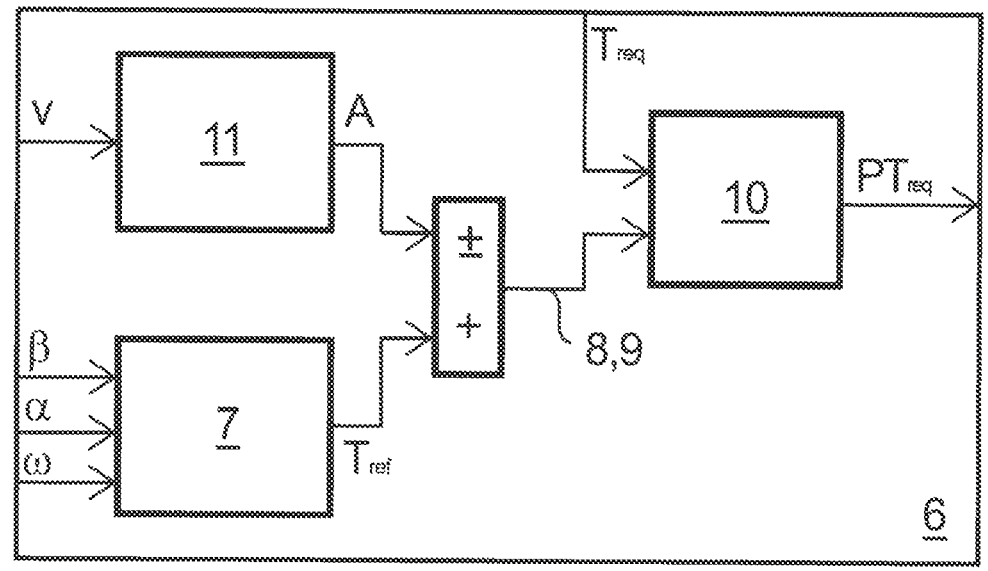
FIG. 4 is a schematic view of another example signal limiting device.

FIG. 4 illustrates a second exemplary embodiment of a signal limiting device 6 according to the invention, which can be used in a steer-by-wire steering system according to FIGS. 1 and 2. The signal limiting device 6 differs from the exemplary embodiment illustrated in FIG. 3 by the manner the way in which the signal is processed. According to FIG. 4, a calculation unit 11 is provided which specifies a maximum deviation A depending on the vehicle speed. The calculation can take place, for example, using a calculation model or a look-up table.

The signal limiting device 6 then determines an upper range limit 8 and a lower range limit 9 of the permissible torque range R by adding the maximum deviation A to or subtracting the maximum deviation A from the reference torque signal $T_{ref}$ specified by the reference controller 7. The upper and lower range limits 8, 9 and the torque request signal $T_{req}$ are fed to a limiter unit 10, which limits the torque request signal $T_{req}$ to the respective upper 8 or lower range limit 9 if it exceeds the upper 8 or the lower range limit 9. The limited signal is output as a limited torque request signal $PT_{req}$.

Otherwise, the statements relating to the first exemplary embodiment apply correspondingly to the second exemplary embodiment.

Figure 5:
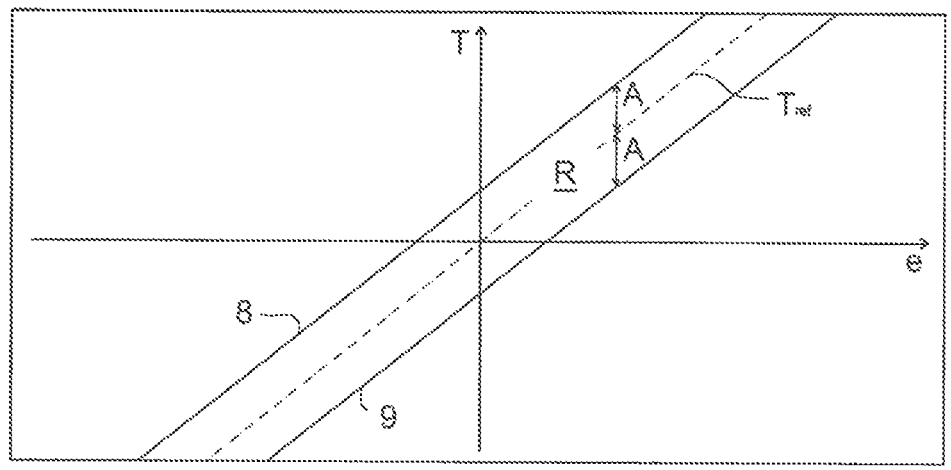
FIG. 5 is a diagram showing a permissible torque range in accordance with a control deviation.

FIG. 5 shows, by way of example, a diagram of a permissible torque range R depending on the control deviation e. In the example illustrated, the reference torque signal is $T_{ref}$ is proportional to the determined control deviation e, i.e. the difference between the desired steering angle β and actual steering angle α. The upper range limit 8 is obtained by adding the maximum deviation A to the reference torque signal $T_{ref}$. Correspondingly, the lower range limit 9 is obtained by subtracting the maximum deviation A from the reference torque signal $T_{ref}$. The permissible torque range R extends between the two range limits 8, 9.

The maximum deviation A can be selected depending on reliable signals that are measured, for example, by the steering actuator and/or are provided by the vehicle. As already stated, the maximum deviation A can depend on the driving speed v, so that permissible ranges R of different widths result for different driving speeds v. Furthermore, the maximum deviation A can also depend on the control deviation e, as a result of which the range limits 8, 9 do not run parallel. In particular, the maximum deviation A can also be selected to be zero. In this case, the steering actuator 2 is activated solely on the basis of the reference torque signal $T_{ref}$.

Finally, it can be advantageous if the maximum deviation A is continuously reduced while the signal limitation continues. It can thereby be achieved that the reference controller 7 gradually takes over the control in the event of a persistent error in the position controller 5 and the reference torque signal $T_{ref}$ is output as a limited torque request signal $PT_{req}$.

LIST OF REFERENCE SIGNS 1 steer-by-wire steering system
2 steering actuator
3 feedback actuator
4 activation unit
5 position controller
6 signal limiting device
7 reference controller
8 upper range limit
9 lower range limit
10 limiter unit
11 calculation unit
α actual steering angle
β desired steering angle
ω angular velocity
e control deviation
v driving speed
$T_{req}$ torque request signal
$T_{ref}$ reference torque signal
$PT_{req}$ limited torque request signal
R permissible torque range
A maximum deviation
$T_L$ steering torque
$F_{Last}$ steering load

What is claimed is:

1. A method for controlling a steer-by-wire steering system for a motor vehicle comprising an electronically controllable steering actuator that acts on steered wheels and that detects an actual steering angle of the steered wheels, a feedback actuator that detects a desired steering angle set via a steering wheel, and an activation unit that activates the electronically controllable steering actuator in accordance with the desired steering angle and the actual steering angle with a limited torque request signal, wherein the method comprises:
    determining a torque request signal with a position controller of the activation unit based at least on the desired steering angle and the actual steering angle;
    limiting the torque request signal in a signal limiting device of the activation unit such that a torque requested by the limited torque request signal is limited to a permissible torque range;
    transmitting the limited torque request signal to the electronically controllable steering actuator; and
    determining with the signal limiting device a reference torque signal by way of a reference controller based at least on the desired steering angle and the actual steering angle, wherein the signal limiting device defines the permissible torque range by way of a selectable maximum deviation from the reference torque signal; and
    wherein the signal limiting device further:
    determines a deviation of the torque request signal from the reference torque signal;

limits the deviation to the selectable maximum deviation; and outputs a sum of the deviation that has been limited and the reference torque signal as the limited torque request signal.

2. The method of claim 1 comprising taking into account a momentary angular velocity of the electronically controllable steering actuator in determining the reference torque signal with the reference controller.

3. The method of claim 2 wherein the reference torque signal contains a first component that is proportional to a difference in the desired steering angle and the actual steering angle and a second component that is dependent on the momentary angular velocity of the electronically controllable steering actuator.

4. The method of claim 1 wherein the reference controller is adapted in an optimized manner to reduce a control deviation.

5. The method of claim 1 comprising selecting the selectable maximum deviation based on a driving speed of the motor vehicle.

6. The method of claim 1 wherein the position controller has a higher bandwidth than the reference controller.

7. The method of claim 1 wherein the signal limiting device determines an upper range limit and a lower range limit of the permissible torque range by adding the maximum deviation to or subtracting the maximum deviation from the reference torque signal and limits the torque request signal if the upper range limit or the lower range limit is exceeded, to the respective upper range limit or the lower range limit.

8. A steer-by-wire steering system comprising:
an electronically controllable steering actuator that acts on steered wheels and via which an actual steering angle of the steered wheels is detectable;
a feedback actuator with which a desired steering angle set via a steering wheel is detectable; and
an activation unit for activating the electronically controllable steering actuator according to the desired steering angle and the actual steering angle by way of a limited torque request signal,
wherein the activation unit contains a position controller and a signal limiting device, wherein the signal limiting device includes a reference controller and is configured to perform the method of claim 1.

* * * * *